United States Patent [19]
Lee

[11] Patent Number: 5,911,394
[45] Date of Patent: Jun. 15, 1999

[54] EASILY REMOVABLE SUCKER WITH STEMS AND EARS

[76] Inventor: Mong-yu Lee, No. 182, Chienfeng Rd., Kaohsiung Hsien, Taiwan

[21] Appl. No.: 08/697,696

[22] Filed: Aug. 28, 1996

[51] Int. Cl.[6] .................................................. A45D 42/14
[52] U.S. Cl. .................................... 248/205.8; 248/205.5
[58] Field of Search ............................ 248/205.8, 309.1, 248/206.2, 205.5, 206.3, 206.4, 103, 104; 160/DIG. 3, DIG. 13, 370.21, 368.1; 296/97.7

[56] References Cited

U.S. PATENT DOCUMENTS

| | | | |
|---|---|---|---|
| 963,264 | 7/1910 | Austin | 248/205.5 |
| 1,267,270 | 5/1918 | Rheinlander . | |
| 1,920,185 | 8/1933 | Carr, Jr. | 248/206.4 |
| 2,958,495 | 11/1960 | Foster | 248/309.1 |
| 3,879,005 | 4/1975 | Flick | 248/205.8 |
| 4,813,641 | 3/1989 | Wilson | 248/309.1 |
| 4,846,429 | 7/1989 | Scheurer et al. | 248/205.8 |
| 5,028,026 | 7/1991 | Phillipps et al. | 248/206.2 |
| 5,323,996 | 6/1994 | Rendall | 248/206.2 |
| 5,611,511 | 3/1997 | Lee | 248/205.8 |
| 5,649,634 | 7/1997 | Irizarry | 211/120 |

*Primary Examiner*—Leslie A. Braun
*Assistant Examiner*—Kimberly T. Wood

[57] ABSTRACT

A sucker includes a conical body, a neck portion formed at one end with the top end of the conical body, a flexible ring formed with the other end of the neck portion, wherein the flexible ring may have two ears provided thereon, and two stems, each of which is integrally formed with the flexible ring at the position adjacent to each of the ears with its first end and formed with the conical body with its second end. Wherein the second end can be formed as a slice or formed with a plurality of legs, e.g. two legs. To remove the sucker from a surface to which it has been attached, a user needs only to find and identify by touch one of the ears, and then pull the ear to pull the corresponding stem so as to raise a part of a peripheral edge of the body, thereby the sucker can be removed in an easy and convenient manner.

7 Claims, 6 Drawing Sheets

EASILY REMOVABLE SUCKER WITH STEMS AND EARS

BACKGROUND OF THE INVENTION

1. Field of the Invention

The present invention relates to an improved sucker structure, more particularly, to a sucker having specific structure which can be easily removed from a surface it adheres to, so as to change the location of the sucker as desired, thereby attaining the effect for convenient use.

2. Description of Related Art

Suckers have been used widely in daily life. A sucker, which is usually used to hold some light-weight objects, for instance, a soap dish, a pan, and a towel etc., is typically attached on a surface, such as a window, a wall and the like, by means of the so-called suction force thereof. The sucker, for example, can hold the sun-shade and be attached on the window of a vehicle. The sucker can be formed into various types of shapes, for different uses.

When a sucker is pressed to be attached to a surface, the air between a conical body of the sucker and the surface is expelled, thus the air pressure inside a space enclosed by the conical body and the surface is smaller than the external air pressure, thereby the sucker can be pressed to be securely attached to the surface by pressing of the external air pressure.

However, it is very difficult to remove the sucker from a surface once it has been securely attached to the surface since the proper position to apply force is difficult to find. If a user pulls a sucker attached to a surface to try to remove it without applying force on a proper position, it will take a lot of exertion to release the suction force of the sucker. In the worse case, the sucker, which is made of soft plastics, might be damaged by improper pulling, and this causes inconvenience for the user.

For example, in the case where a sucker is used to hold a sun-shade and is attached to the window of a vehicle, the difficulty in removing the sucker from the window, results in great inconvenience for the driver if he wants to change the location of the sun-shade when driving. This will be described more detail later.

Now refer to FIG. 7, which shows a conventional sucker for holding a sun-shade to support it on a window of a vehicle. In FIG. 7, a sucker 30 has a conical body 31, a neck portion 32 with its one end integrally formed thereto, and a ring 34 is extended through a through-hole 33 defined in the neck portion 32. When the sucker 30 is combined with a sun-shade 40, the neck portion 32 without the ring 34 is firstly penetrated through an aperture 41 of the sun-shade 40, and then the ring 34 is extended into the through hole 33 of the neck portion 32. After the combination is completed, the sun-shade 40 can be held on the window of a vehicle by the sucker 30 with its conical body 31 having been pressed to suck on the window. However, the direction of sunlight may change for the driver as the vehicle is traveling so the driver often needs to move the sun-shade in order to put it at a proper position for shielding the driver from sunlight. If the driver wants to move the sun-shade 40 by removing the sucker 30 from the window, he needs to push the sun-shade aside with one hand, and pull a link 311 provided on the edge of the body 31 with the other hand to cause a gap to be generated between the body 31 and the window to let air go into the space between the conical body 31 and the window, and then the pressure inside said space and the external air pressure are equilibrated, thereby the sucker 30 can be removed. In this case, the driver has to use both his hands to move the sun-shade in the manner as mentioned above, which is very inconvenient and dangerous for the driver. Therefore, the need for a sucker which is easily removable from a surface exists.

SUMMARY OF THE INVENTION

One object of the present invention is to provide an improved sucker structure, which can be easily removed from a surface to which it is attached.

Another object of the present invention is to provide an improved sucker structure, which is not easy to be damaged when it is pulled to be removed from the surface to which it is attached.

Still another object of the present invention is to provide an improved sucker structure, which has a particular shape so the user can easily find by touch the proper position to apply force.

In accordance with one aspect of the present invention, the sucker comprises a conical body, a neck portion integrally formed at a first end with the top end of the conical body, a flexible ring connected with a second end of the neck portion, wherein the flexible ring may have at least one ear provided the proper positions of the ring, and at least one stem, each of which has a first end connected with the flexible ring at the position adjacent to each of the ears and a second end connected with the conical body.

When using the sucker of the present invention to hold an object to be hung on a surface, the stems can be pinched with the flexible ring to be deformed to pass through a hole of the object, and then the sucker is pressed to be attached to the surface.

To remove the sucker from the surface, the user can pull either of the ears to drag the stem connected therewith. A part of the edge of the conical body is raised by the pulling of the stem, thereby a gap is generated between the conical body and the window, and air enters the space previously enclosed by the conical body and the window via the gap. As a result, the suction force of the sucker is released and the sucker can be easily and quickly removed from the window.

Other objects, advantages and novel features of the invention will become more apparent from the following detailed description when taken in conjunction with the accompanying drawings.

DETAILED DESCRIPTION OF PREFERRED EMBODIMENT

Figure 1:
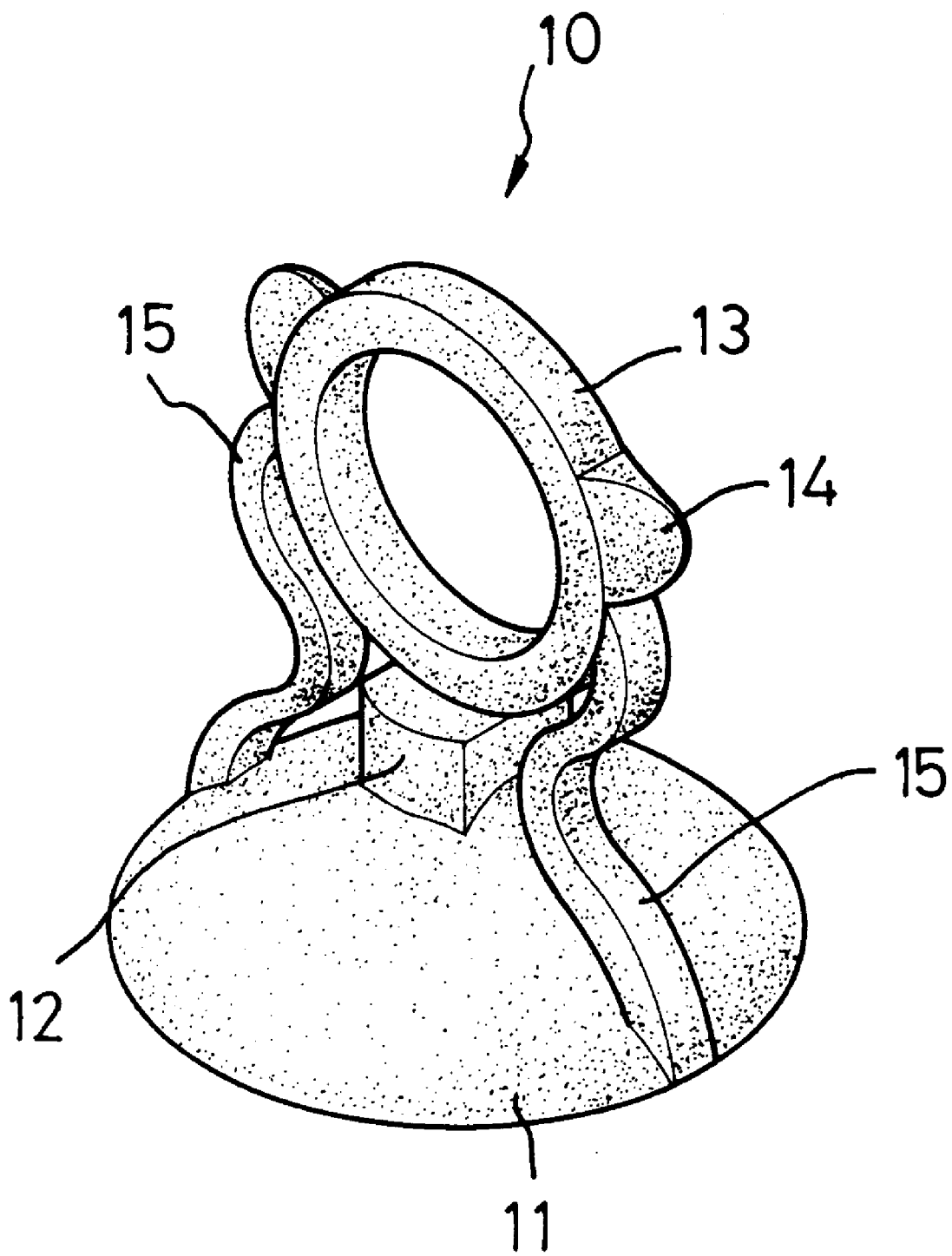
FIG. 1 is a perspective view of a sucker in accordance with an embodiment of the present invention.

Firstly refer to FIG. 1, which shows an embodiment of the present invention. In FIG. 1, numeral 10 refers to a sucker of the present invention, which comprises a conical body 11, a neck portion 12 having a first end integrally formed with the top end of the conical body 11, a flexible ring 13 connected with a second end of the neck portion 12, two ears 14 symmetrically provided on an edge of the flexible ring 13, and two stems 15, each of which having a first end connected with the flexible ring at the position blow and adjacent to each of the ears 14 and a second end connected with the conical body 11 at a proper position, respectively. Each of the two ears 14 projects from the proper position at the edge of the flexible ring, and each of the stems 15 is preferably shaped as a curved line. Furthermore, the proper positions where the stems 15 are formed with the conical body 11 are preferably near a peripheral edge of the body 11, as shown in FIG. 1.

Figure 2:
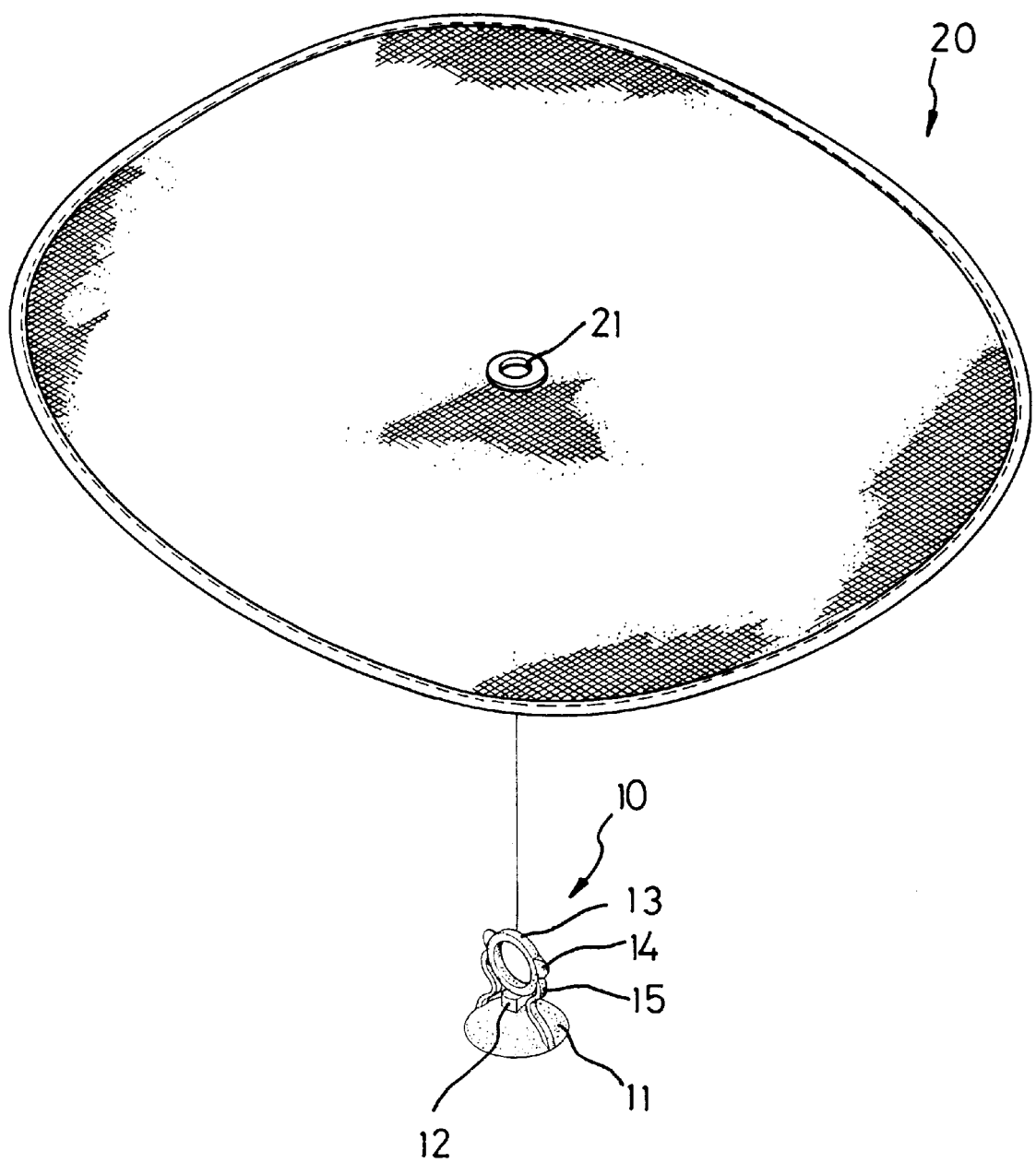
FIG. 2 is an exploded perspective view showing the sucker of FIG. 1 and a sun-shade for a vehicle.
Figure 3:
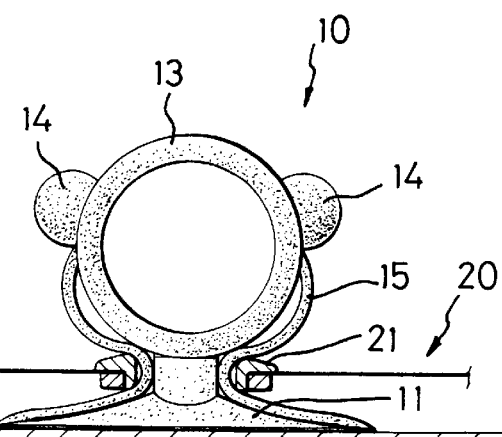
FIG. 3 shows the sucker of the embodiment of the present invention combining with the sun-shade is attached to a surface.

Now refer to FIGS. 2 and 3, the manner for combining the sucker 10 of this embodiment and the sun-shade 20 for a vehicle will be described in detail. To combine the sucker 10 and the sun-shade 20, the flexible ring 21 of the sucker 10 can be deformed by pinching so that it can extend through an aperture 21 of the sun-shade, wherein the stems 15 are also pinched as the flexible ring 13 to pass through the aperture 21. As a result, a rim defining the aperture 21 surrounds the stems 15 and the neck portion 12 and is supported at the neck portion 12, so the combination of the sucker 10 and the sun-shade 20 is completed, as shown is FIG. 3. Thus, the sun-shade 20 can be hung on the window of a vehicle by means of the sucker 10 for shielding the vehicle's occupants from sunlight.

Figure 4:
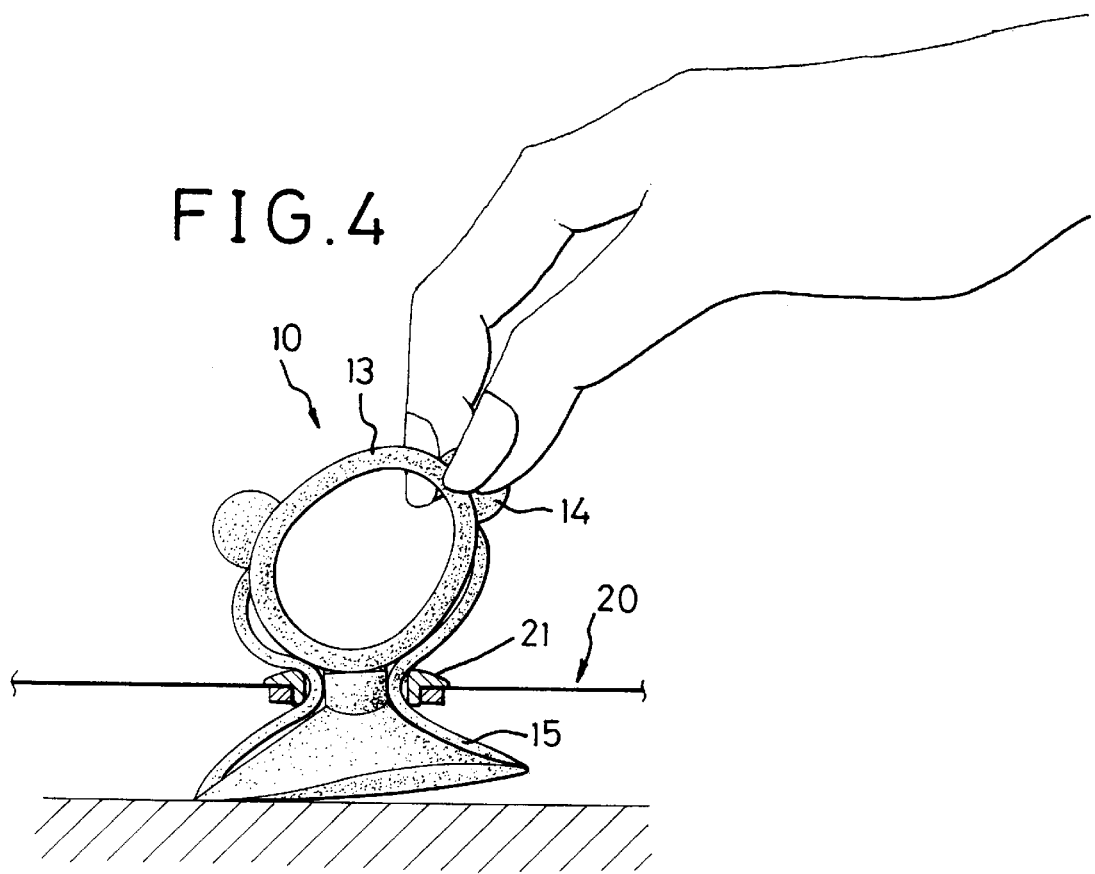
FIG. 4 is a diagram showing the condition that the sucker of FIG. 3 is being removed from the surface.

During the travel of the vehicle, the driver often needs to change the position of the sun-shade to screen sunlight since the direction of sunlight may vary. At this time, the driver can just touch the sucker 10 to find immediately one of the ears 14 as the proper point to apply force, and pull the ear 14 to draw the corresponding stem 15, so as to raise a part of the peripheral edge of the conical body 11, as shown in FIG. 4, resulting in a gap being generated between the conical body 11 and the window to let air enter therein, whereby the sucker 10 can be easily removed from the window. Then the driver can place the sun-shade in any position as desired.

In the operation described above, it is very convenient for the driver to move the sun-shade by changing the position of the sucker 10 with only one hand. This is because each of the stems 15 is linked with the flexible ring 13 and the conical body 11, respectively, and the two ears 14, which are easily found and identified by touch, are symmetrically provided on the flexible ring 13. Accordingly, the driver can move the sun-shade i.e. move the sucker 10, to any position as desired with only one hand without giving his attention, so he can concentrate on driving. It is evident that using the sucker of the present invention, which can be removed from a surface in an easy and simple manner, provides great convenience to the user.

In addition, the ends of stems 15 for connecting to the conical body 11 can be formed as a slice which is wider than the width of the remained portion of the stems 15. That is, the area where the stems 15 connected to the conical body 11 becomes large, and therefore it is easily to remove the sucker from a surface.

Figure 5:
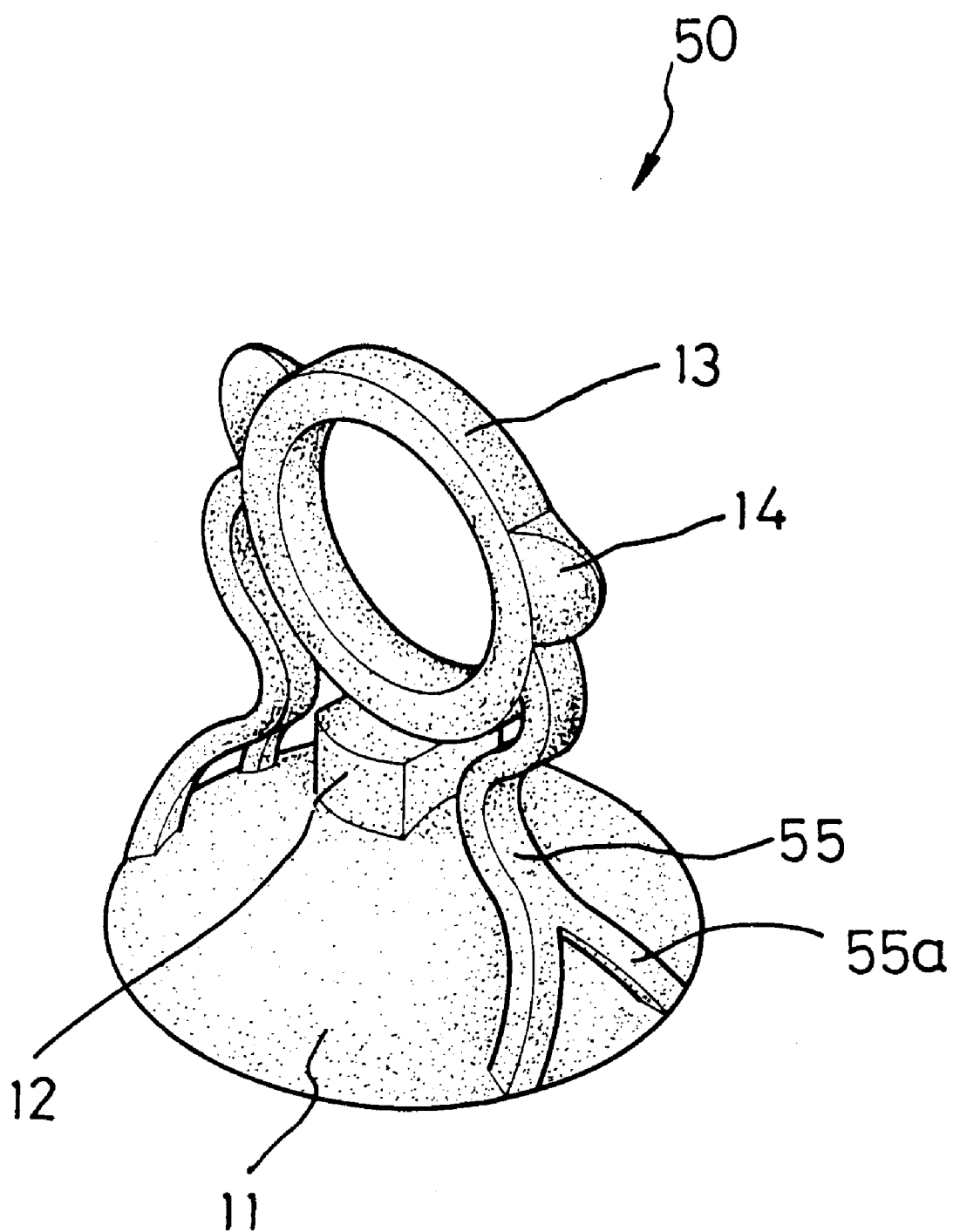
FIG. 5 is a perspective view of a sucker in accordance with another embodiment of the present invention.

A sucker 50 of another embodiment of the present invention is shown in FIG. 5. In FIG. 5, the numerals which are the same as those in FIG. 1 indicate same portions. The sucker 50 of this embodiment is identical to the sucker 10 of the first embodiment except for the stems 55 thereof. As shown in FIG. 5, each of the stems 55 has a first end integrally formed with the flexible ring 13 as in the first embodiment. However, a second end of each of the stems is split into a plurality of legs 55a (e.g. two legs), which are connected with the conical body 11 at proper positions, respectively.

The manner for combining the sucker 50 and an object to be hung, such as the sun-shade 20, is the same as that in the first embodiment as described above. Therefore, the description about this is omitted herein to avoid repetition.

Figure 6:
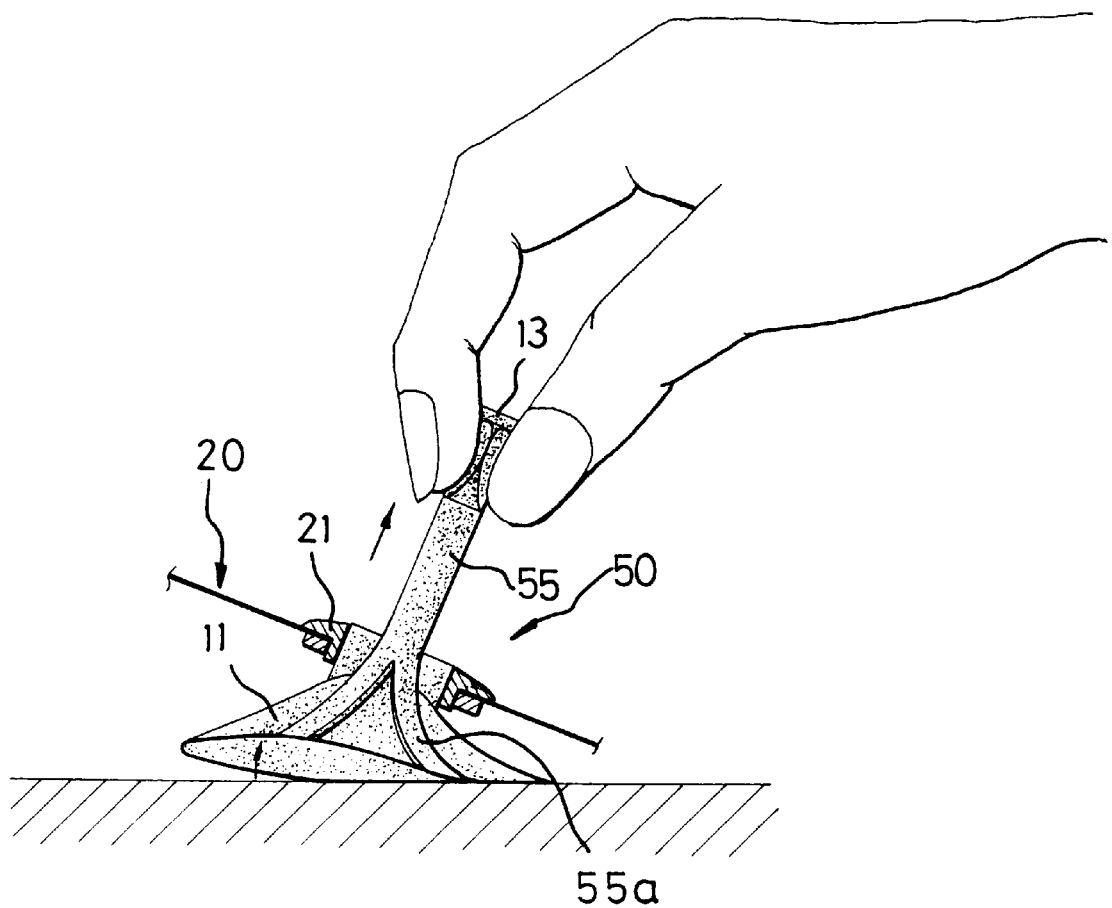
FIG. 6 shows the condition that the sucker of FIG. 5 is being removed from the surface.
Figure 7:
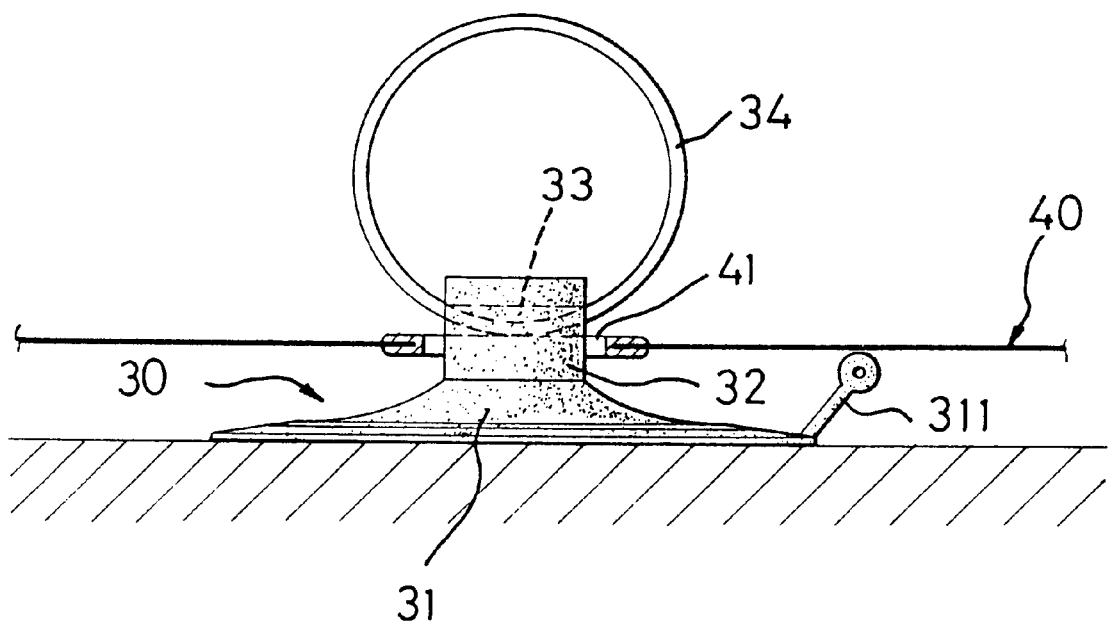
FIG. 7 shows a conventional sucker combined with a sun-shade.

To remove the sucker 50 from a surface after it has been attach thereto, refer to FIG. 6, a user can pull one of the ears 14, and therefore pull the corresponding stem 55. Accordingly, either of legs 55a is pulled to raise a part of the peripheral edge of the conical body 11, resulting in a gap being generated between the conical body 11 and the surface to let air enter therein, whereby the suction force of the sucker 50 can be released easily. Since each of the stems 55 has one end split into a plurality of legs 55a, the legs 55a are connected with the conical body 11 at a plurality of positions in various directions, respectively, the user can easily and quickly remove the sucker 50 from the surface without considering the direction for applying force. By utilizing the split legs 55a of the stems, the user can remove the sucker 50 from the surface it attaches to by applying only a little force and without consideration about the direction for applying force, results in a more convenient use.

In the respective cases that the ends of the stems for connecting with the conical body formed as a splice or a plurality of legs, it has the advantage that the sucker is not easy to be damaged since it is very easy to be removed from a surface. For example, in the case that the sucker holding the sun-shade is attached to the window glass of a car, if the driver lowers the window and forgets to remove the sun-shade first, the sucker holding the sun-shade will be separated from the glass when it contacts with window slot, thus, the sucker will not be damaged.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sucker structure comprising:
   a body for attaching to a surface, the body being elastic and including a central conical portion and a peripheral rim;
   a neck portion connected to said body;
   a flexible ring connected to said neck portion;
   at least two stems each being connected between said flexible ring and said body at two spaced apart locations on said peripheral rim; and at least two ears each being provided on said flexible ring and each adjacent to a corresponding one of said stems for being manipulatable to stretch said corresponding stem to thereby raise the peripheral rim of said body.

2. The sucker structure according to claim 1, wherein each of said stems comprises a widened end for connecting with said body.

3. The sucker structure according to claim 1, wherein each of said stems is formed as a curved shape.

4. A sucker structure comprising:
   a body for attaching to a surface, the body being elastic and including a central conical portion and a peripheral rim;

a neck portion connected to said body;

a flexible ring connected to said neck portion; and at least two stems each having a first end formed on said flexible ring and a second end with a plurality of legs formed on said body at the peripheral rim, each of said stems being operable to raise part of said body at said peripheral rim.

5. The sucker structure according to claim 4, wherein said second end of each of said stems is formed with two legs.

6. The sucker structure according to claim 4, further comprising at least two ears each being provided on said flexible ring and each adjacent to a corresponding one of said stems for being manipulatable to stretch said corresponding stem to thereby pull an edge part of said body.

7. The sucker structure according to claim 4, wherein each of said stems is formed as a curved shape.

* * * * *